United States Patent [19]

Ishimura et al.

[11] Patent Number: 5,440,418
[45] Date of Patent: Aug. 8, 1995

[54] METHOD AND APPARATUS FOR ALARM SURVEILLANCE FOR AN OPTICAL TRANSMISSION SYSTEM

[75] Inventors: Katsuhiro Ishimura; Hiroshi Takamoto; Shusei Aoki, all of Tokyo, Japan

[73] Assignee: Oki Electric Industry Co., Ltd., Tokyo, Japan

[21] Appl. No.: 80,113

[22] Filed: Jun. 23, 1993

[30] Foreign Application Priority Data

Jul. 15, 1992 [JP] Japan .................. 4-188214

[51] Int. Cl.[6] .................. H04B 10/08
[52] U.S. Cl. .................. 359/177; 359/110
[58] Field of Search ............. 359/110, 177, 349, 179; 375/3.1; 370/13.1

[56] References Cited

U.S. PATENT DOCUMENTS

| | | | |
|---|---|---|---|
| 4,211,920 | 7/1980 | Wakabayashi | 359/177 |
| 5,260,819 | 11/1993 | Hadjifotiou | 359/110 |
| 5,274,496 | 12/1993 | Fujiwara | 359/177 |
| 5,282,074 | 1/1994 | Miyazaki | 359/177 |
| 5,293,260 | 3/1994 | Kikawa | 359/110 |
| 5,296,957 | 3/1994 | Takahashi | 359/177 |

FOREIGN PATENT DOCUMENTS

| | | | |
|---|---|---|---|
| 0449475 | 10/1991 | European Pat. Off. | |
| 0244233 | 10/1991 | Japan | 359/110 |
| 3-258036 | 11/1991 | Japan | |
| 3-258038 | 11/1991 | Japan | |
| 3278627 | 12/1991 | Japan | 359/177 |
| 2074424 | 10/1981 | United Kingdom | |
| 2245120 | 12/1991 | United Kingdom | |
| WO92/17008 | 10/1992 | WIPO | |

*Primary Examiner*—Leslie Pascal
*Attorney, Agent, or Firm*—Steven M. Rabib

[57] ABSTRACT

Each optical repeater in an optical transmission system includes an optical amplifier, and a control circuit for controlling the optical transmission. Furthermore, each optical repeater transmits management information to the next optical repeater. The control circuit checks the status of the optical amplifier and obtains monitoring information. The control circuit generates management information in accordance with the monitoring information and the management information transmitted from the upstream side optical repeater. The management information is converted to an optical signal and transmitted to the next optical repeater. A receiving station receives the management information. The management information includes an ID code for an optical repeater which has failed and the status of the failure. Different categories of management information have priorities which can be changed by the receiving station, and thus the receiving station can detect the status of the optical transmission line easily and flexibly.

7 Claims, 3 Drawing Sheets

METHOD AND APPARATUS FOR ALARM SURVEILLANCE FOR AN OPTICAL TRANSMISSION SYSTEM

FIELD OF THE INVENTION

This invention relates to an optical transmission system for transmitting an optical signal, and to an optical repeater apparatus which is disposed in the optical transmission system. And more specifically, the invention relates to control and management of the optical transmission system and the optical repeater apparatus.

DESCRIPTION OF THE RELATED ART

Optical transmission techniques are being used more in the telecommunication field. An optical transmission system is connect between a transmitting station and a receiving station. In practical optical transmission systems, one or more optical repeaters are required for amplifying the light signal on the optical transmission system.

One conventional method of such optical repeating transmission is disclosed in the Japanese Laid-Open Patent Application No. 91-258036. In this disclosure, a unique frequency is given to each optical repeater, and each optical repeater modulates a management signal by the unique frequency. The management signal of each optical repeater is wavelength multiplexed and transmitted to the next optical repeater or the receiving station.

Another conventional method is disclosed in the Japanese Laid-Open Patent Application No. 91-258038. This method, also, gives a unique frequency to each optical repeater. Each optical repeater modulates a management signal by the unique frequency, and then modulates an output of a pump light by the modulated management signal. The modulated pump light is transmitted to the next optical repeater or the receiving station.

SUMMARY OF THE INVENTION

Accordingly, it is an object of this invention to provide an optical repeater apparatus which utilize a common frequency for modulating the management signal at each optical repeater. It is another object of this invention to provide an optical repeater apparatus in which management-information-priority is easily changeable. It is still another object of this invention to provide an optical transmission system, in which a failure point can be easily detected.

DESCRIPTION OF THE PREFERRED EMBODIMENT

Figure 1:
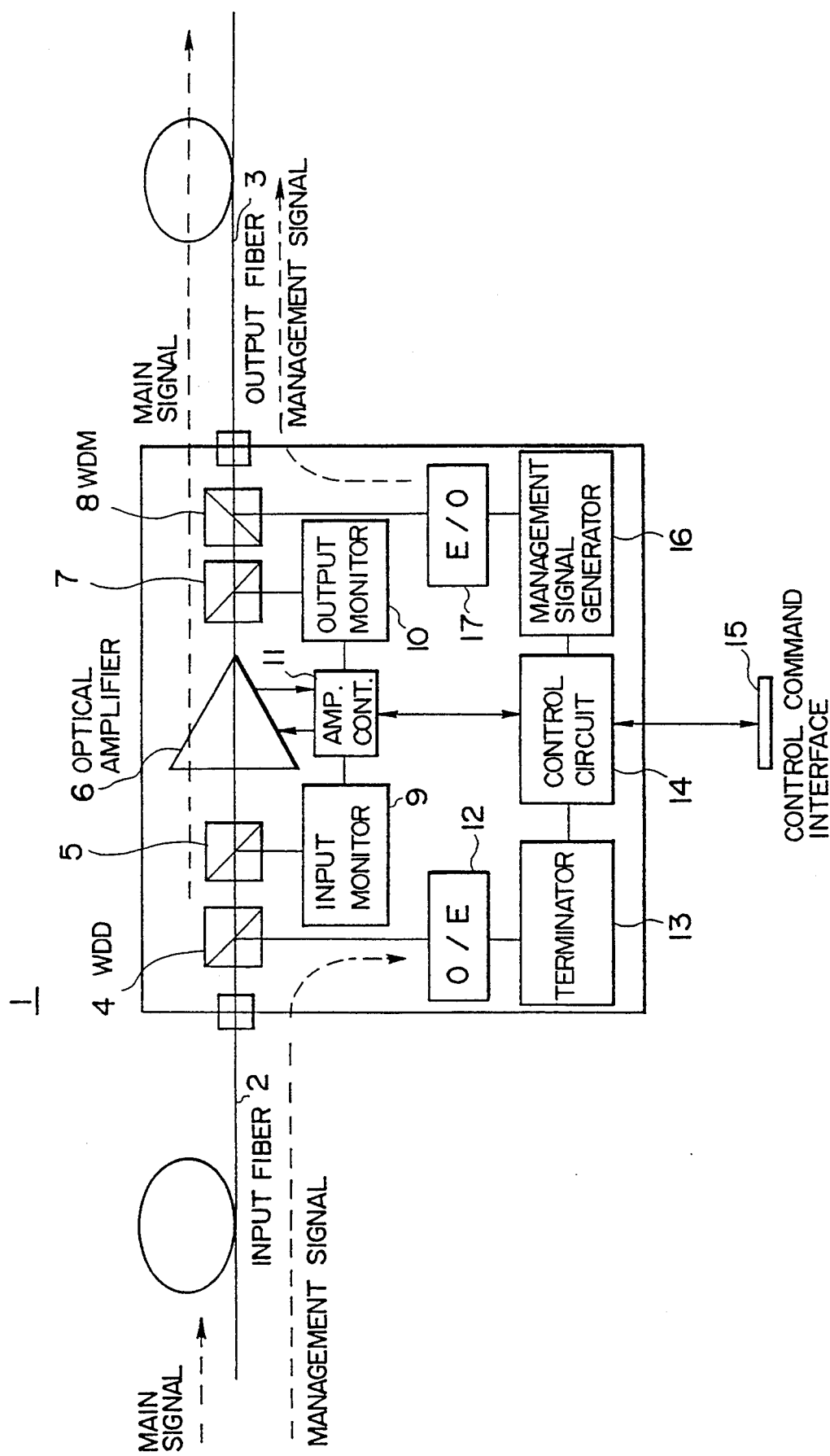
FIG. 1 shows a schematic diagram of this invention.

An optical repeater apparatus 1 amplifies an input optical signal inputted at input fiber 2, and outputs an amplified optical signal at output fiber 3. The other end of the input fiber 2 or output fiber 3 is connected to another optical repeater apparatus, a transmitting station, or a receiving station (not shown).

The configuration of the optical repeater is explained hereinbelow. An optical signal on an optical transmission line is inputted at input fiber 2. The inputted optical signal is separated to a main signal and a management signal at wavelength division demultiplexer (WDD) 4. The main signal is then applied to an optical amplifier 6 via an optical coupler 5. The optical amplifier 6 amplifies the main signal and outputs it to wavelength division multiplexer (WDM) 8 via an optical coupler 7.

The optical coupler 5 divides out a portion of the inputted main signal and applies the divided main signal to an input monitor 9. The optical coupler 7 divides out a portion of amplified main signal and applies the divided main signal to an output monitor 10. Monitoring information from the input monitor 9 and the output monitor 10 are fed to an amplifier controller 11.

The management signal is convened to an electric signal at opt/electric converter 12, and applied to a terminator 13. The terminator 13 reconstructs management information transmitted from another optical repeater which is disposed upstream on the optical transmission line. The management information is applied to a control circuit 14. The information from the amplifier controller 11 is also applied to the control circuit 14. The control circuit 14 is connected to control command interface 15. Control commands are applied to the control circuit 14 via the control command interface 15.

The control circuit 14 outputs management information in accordance with information from the amplifier controller 11, the terminator 13, and the control commands applied at the control command interface 15. The management information is applied to a management signal generator 16. The management signal generator 16 generates the management signal, which includes the management information. The management signal is convened to an optical signal at an electric/opt converter 17. The management signal is then applied to the wavelength division multiplexer 8, and transmitted to the another optical repeater, or the receiving station.

The control command interface 15 is connected to another network, namely, a Telecommunication Management Network (TMN, not shown). The TMN connects each optical repeater, the transmitting station, and the receiving station. Control commands are transmitted on the TMN. The control commands have higher priority than that of the management information transmitted on the optical transmission line.

Next, the function of the optical repeater will be explained hereinbelow, In the optical transmission line, the main signal having a first wavelength and the management signal having a second wavelength are wavelength division multiplexed and transmitted. The wavelength division demultiplexer 4 has a wavelength filter, which passes the first wavelength and reflects the second wavelength, and the first wavelength and the second wavelength are separated. The wavelength division multiplexer 8 also has a wavelength filter, which passes the first wavelength and reflects the second wavelength, and thereby the first wavelength and the second wavelength are re-multiplexed.

Preferably, an Erbium Doped Fiber Amplifier (EDFA) is utilized as the optical amplifier 6. The input main signal is amplified and outputted to the output fiber 3 via the optical coupler 7 and the wavelength division multiplexer 8.

The inputted main signal is divided at the optical coupler 5 and the amplified main signal is divided at the optical coupler 7. The dividing ratio of the optical couplers is, for example, 1/10 respectively. The input main signal is monitored at the input monitor 9, while the amplified main signal is monitored at the output monitor 10. By comparing the input signal monitoring information and the output signal monitoring information at the amplifier controller 11, the amplifying ratio of the optical amplifier can be obtained.

The amplifier controller 11 outputs other monitoring information containing, for example, "Normal" information which indicates that the status of the optical amplifier is normal, "Amplifier Failure" information which indicates that the optical amplifier has failed, "Loss of Signal" which indicates that there is no input main signal to the optical amplifier. The monitoring information also contains the amplifying ratio of the optical amplifier 6.

The control circuit 14 monitors and controls the function and operation of the optical repeater. The control circuit 14 generates management information in accordance with the management information transmitted from another optical repeater, monitoring information from the amplifier controller 11, and the control command applied the control command interface 15. The management information generated at the control circuit 14 is as follows:

NOR (Normal): indicates that the monitoring information amplifier is Normal.

LOS (Loss of Signal): indicates that the monitoring information is "Loss of Signal."

RF (Repeater Failure): indicates that the monitoring information is amplifier failure.

MSF (Management Section Failure): indicates a failure in the management function of the-optical repeater.

These management information are inputted to the management signal generator 16 and transmitted to the next optical repeater by being contained in the management signal.

Figure 2:
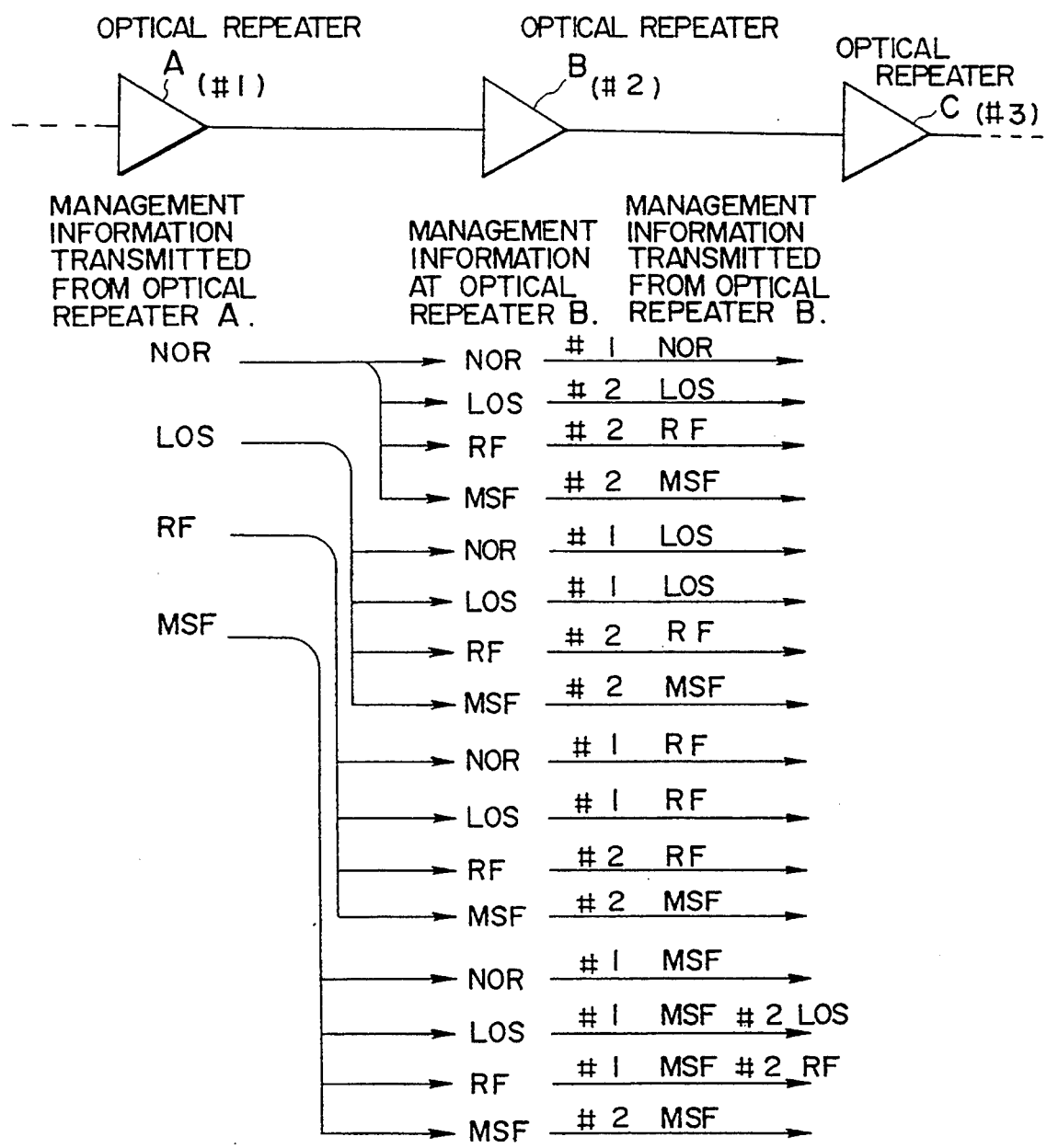
FIG. 2 shows an optical transmission line on which this invention is adopted.
Figure 3:
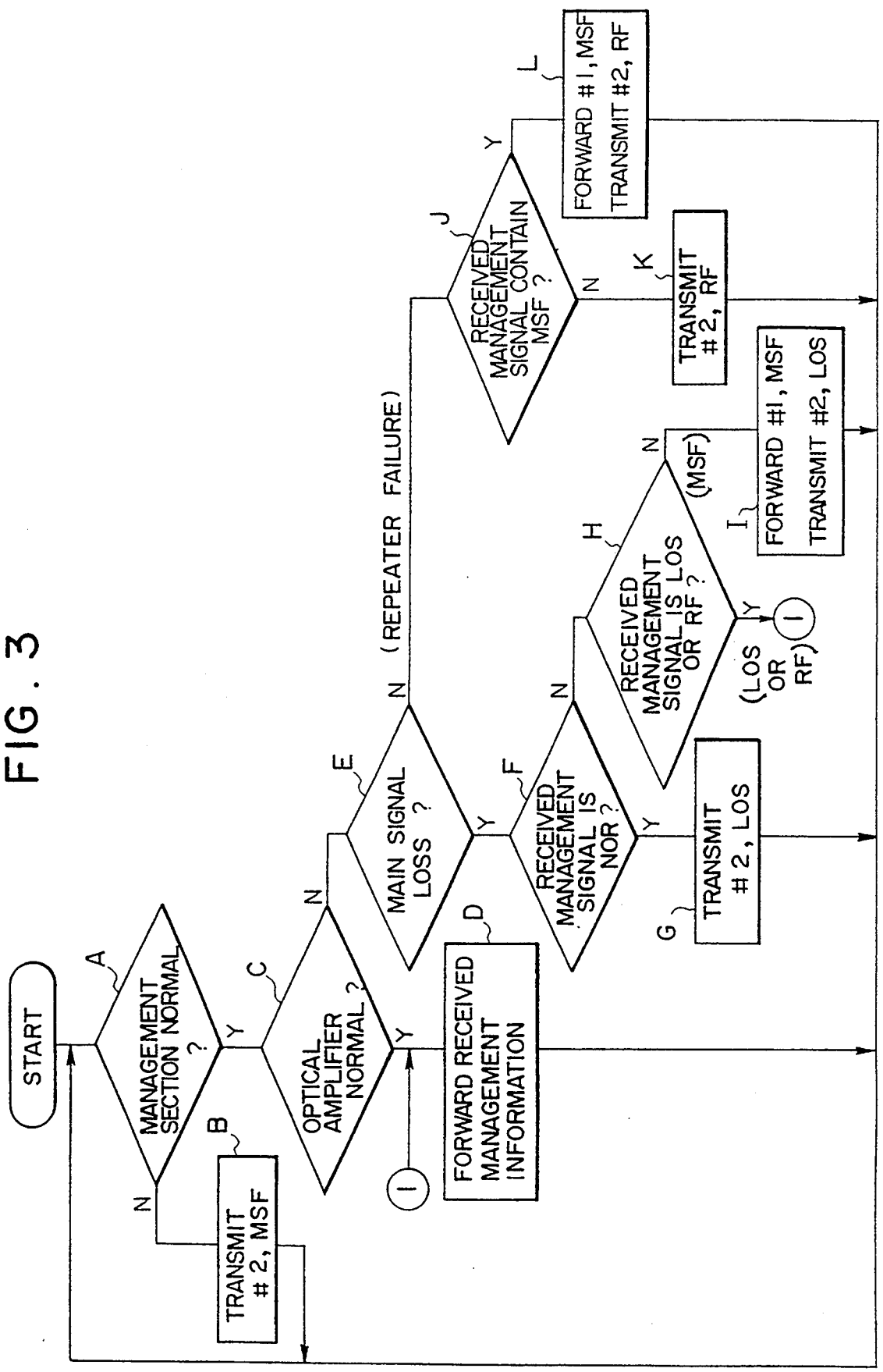
FIG. 3 shows a flowchart of the function and operation of the optical repeater.

In FIG. 2, an optical transmission line is described. The optical transmission line shown in FIG. 2 has an optical repeater A having an ID code #1, an optical repeater B having an ID code #2, and an optical repeater C having an ID code #3. The function and operation of the optical repeater B (#2) will be explained below. FIG. 3 is a flowchart of the function and operation of the optical repeater B. It is noted that similar function and operation are performed at each optical repeater. Such functions and operation can be achieved by a microprocessor in the control circuit of each optical repeater.

First, at STEP A, the optical repeater B examines the status of the management section, that is, opt/electric converter 12, terminator 13, control circuit 14, management signal generator 16, electric/opt converter 17, input monitor 9, and output monitor 10. In case of a failure in the management section, the optical repeater B transmits the ID code #2 and MSF to the next optical repeater C at STEP B. The management information transmitted from the optical repeater A and the monitoring information from the amplifier controller 11 are ignored in this situation.

If the status of the management section is normal, the optical repeater B then examines the status of the optical amplifier 6 at STEP C. If the optical amplifier 6 is normal, the optical repeater B transmits the ID code #1 and the management information. transmitted from the optical repeater A through to the optical repeater C at STEP D.

However, if the optical amplifier 6 is not normal, the optical repeater B examines or not the main signal is present at the input fiber 2 at STEP E. If main signal from the optical repeater A is down, the optical repeater B then examines the management information from the optical repeater A at STEP F.

At STEP F, if the management information from the optical repeater A contains NOR, this indicates that the transmission failure occurred on the transmission line between optical repeater A and optical repeater B. In this situation, the optical repeater B transmits the ID code #2 and LOS at STEP G. If the management information from the optical repeater A does not contain NOR but contains LOS (STEP H), this indicates that the main signal is down at the optical repeater A. Similarly, if the management information from the optical repeater A does not contain NOR but contains RF, this indicates that the monitoring information generated at the optical repeater B is amplifier failure. In these situations, the optical repeater B transmits the ID code #1 and the management function LOS or RF transmitted from the optical repeater A through to the optical repeater C at STEP D.

At STEP H, if the transmitted management information from the optical repeater A doesn't contain either LOS or RF, but contains MSF, this indicates that the management section of the optical repeater A has failed in this situation, the optical repeater B transmits to the next optical repeater C the ID code #2 and LOS, in addition to the ID code #1 and MSF transmitted from the optical repeater A at STEP I.

If the optical amplifier 6 is not normal, the optical repeater B examines whether or not the main signal is present at the input fiber 2 at STEP E. If the main signal from the optical repeater A is present at the input fiber 2, this indicates that the optical amplifier 6 itself is down. In this situation, the optical repeater B examines the management information transmitted from the optical repeater A at STEP J. At STEP J, if the examined management information doesn't contain MSF, the optical repeater B transmits the ID code #2 and RF to the optical repeater C at STEP K. If the examined management information contains MSF, the optical repeater B transmits the ID code #2 and RF, in addition to the transmitted ID code #1 and MSF from the optical repeater A at STEP L.

In the optical transmission line, especially if it utilizes repeaters with EDFA amplifiers, large electric power is produced and transmitted to the next optical repeater if an optical signal is re-inputted after a main-signal-loss of several msec duration. This may destroy the optical amplifier of the next optical repeater. To prevent this situation, and to prevent an overcurrent of the optical amplifier if the driving current of the laser light source for pump light increases beyond a predetermined level, the amplifier controller halts driving of the optical amplifier. The optical repeater of the invention is able to detect the status of another optical amplifier at the upstream side even if the main signal is down.

As explained above, the optical repeater B transmits the management information transmitted from the optical repeater A through to the optical repeater C, in case that the status of the optical repeater B is normal. The optical repeater B terminates the management information transmitted from the optical repeater A, and transmits the status of the optical repeater B to the optical repeater C in most cases where optical repeater B has failed. However, if the transmitted management information from the optical repeater A contains MSF, the optical repeater B transmits the status of the optical repeater B, in addition to the status of the optical repeater A (with the exception of step B in FIG. 3).

The receiving station receives the management information. By detecting and analyzing the received information, the receiving station determines whether a failure has occurred on the transmission line or not, and if so what kind of failure. As explained above, the management information has priority for transmission to the next optical repeater or the receiving station. For example, if there has been a management section failure, MSF is transmitted to the next optical repeater. The receiving can thus easily detect that the management section failure occurred at a particular optical repeater. In this situation, however, the receiving station cannot determine the status of the optical amplifier. Accordingly, a priority change is provided in this invention.

A priority change is achieved by the control command applied to the control circuit 14. The control command is applied from the receiving station or Network management system (not shown) via the control command interface 15. The control circuit 14 changes the priority of the management information in accordance with the control commands. Thereby the receiving station can detect NOR, LOS, or RF at other priorities, As a result, the failure point is easily detected.

In this embodiment, the frequency for modulating the management information is common to each optical repeater. Thus, an additional optical repeater can easily be introduced. Furthermore, position conversion of the optical repeaters and maintenance of the optical transmission line are also easily achieved. The main signal and the management signal are wavelength division multiplexed and transmitted on a common optical fiber in this embodiment. Each signal, however, can be transmitted on another optical fiber respectively.

What is claimed is:

1. A method for operating a first optical repeater apparatus disposed between an input optical fiber and an output optical fiber, the first optical repeater apparatus including a first optical amplifier means for amplifying a main signal received on the input fiber and transmitting the amplified main signal on the output fiber, the first optical amplifier means having a status, the first optical repeater apparatus additionally including first managing means for generating management information, the first managing means having a status, said method comprising the steps of:
   (a) receiving a management signal on the input fiber from a second optical repeater apparatus;
   (b) examining the status of the first managing means;
   (c) examining the status of the first optical amplifier means if the status of the first managing means is normal, and;
   (d) forwarding the management signal received in step (a) by emitting the received management signal on the output fiber if the status of the first managing means is normal and the status of the first optical amplifier means is normal.

2. The method according to claim 1, further comprising the step of transmitting, on the output fiber, management information generated by the first managing means if the status of the first managing means is not normal when it is examined in step (b).

3. The method according to claim 1, wherein step (c) comprises the step of examining whether the main signal is present on the input fiber or not; and wherein the method further comprises the step of transmitting, on the output fiber, management information generated by the first managing means if the main signal is not present on the input fiber and the management signal received in step (a) indicates that the second optical repeater apparatus is normal.

4. The method according to claim 3, wherein the second optical repeater apparatus includes second optical amplifier means for amplifying the main signal and transmitting the amplified main signal toward the first optical repeater apparatus via the input fiber, and wherein the method further comprises the step of forwarding the management signal received in Step (a) by emitting the received management signal on the output fiber if the main signal is not present on the input fiber at the first optical repeater apparatus and the management signal received in step (a) indicates that the second optical repeater apparatus has lost its main signal input, or the second optical amplifier means of the second optical repeater apparatus has failed.

5. The method according to claim 1, wherein the second optical repeater apparatus includes a second managing means having a status, and wherein the method further comprises the step of transmitting, on the output fiber, management information generated by the first managing means if the management signal received on the input fiber in step (a) indicates that the status of the second managing means of the second optical repeater apparatus is normal if the status of the first optical amplifier means is not normal when it is examined in step (c), and if the main signal is present on the input fiber at the first optical repeater apparatus.

6. The method according to claim 1, wherein the second optical repeater apparatus includes a second managing means having a status, and wherein the method further comprises the steps of transmitting, on the output fiber, management information generated by the first management means and forwarding, on the output fiber, the management signal received in step (a) if the management signal received in step (a) indicates that the status of the second managing means of the second optical repeater apparatus is not normal and if the status of the first optical amplifier means is not normal when it is examined in step (c).

7. The method according to claim 1, wherein the main signal has a main signal wavelength and the management signal has a management signal wavelength that is different from the main signal wavelength.

* * * * *